United States Patent [19]
Yankowsky

[11] 3,839,272

[45] Oct. 1, 1974

[54] HYDROLYTIC AND MELT DEGRADATION STABILIZED POLYESTER

[75] Inventor: Anthony Walter Yankowsky, Charlotte, N.C.

[73] Assignee: Fiber Industries, Inc., Charlotte, N.C.

[22] Filed: Feb. 27, 1973

[21] Appl. No.: 336,396

[52] U.S. Cl............ 260/45.7 P, 260/75 P, 260/860, 264/176
[51] Int. Cl............................................ C08c 11/66
[58] Field of Search............. 260/45.7 P, 75 P, 860; 264/176

[56] References Cited
UNITED STATES PATENTS

| | | | |
|---|---|---|---|
| 2,938,015 | 5/1960 | Gormley | 260/45.7 P |
| 3,396,149 | 8/1968 | Roedel et al. | 260/75 P |
| 3,404,121 | 10/1968 | Barkley | 260/45.7 P |
| 3,627,867 | 12/1971 | Schwarz | 264/176 R |

Primary Examiner—Melvyn I. Marquis
Attorney, Agent, or Firm—Thomas J. Morgan; Robert J. Blanke

[57] ABSTRACT

Low carboxyl end group polyesters are stabilized against melt degradation and strength loss by the addition to the polyester, after the polycondensation stage, of stabilizing amounts of polyphosphoric acid having the structure

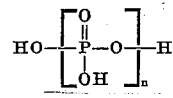

where $n \geq 3$.

The polyester is thereby stabilized without either substantial poisoning of the catalyst, degradation of the polymer or loss of substantial amounts of phosphorus-containing compound.

8 Claims, No Drawings

HYDROLYTIC AND MELT DEGRADATION STABILIZED POLYESTER

This invention relates to stabilized polyesters and, more specifically, to polyester yarns which have been stabilized against hydrolytic degradation, melt degradation and strength loss.

Polyester yarns have been found to be especially suitable for certain industrial applications such as, for instance, pneumatic tires, conveyor belts, bridge pads and, in general, those rubber articles which require filamentary reinforcement. For certain of these applications more exacting demands have been placed on the polyester filamentary reinforcing material. It is known, for instance, that the cord of polyester cord reinforced rubber articles will show superior strength retention under high temperature operating conditions if the free carboxyl group concentration of the polyester comprising the cords is reduced to about 20 to 15 or less equivalents per million grams. Representative of prior art processes for the preparation of low carboxyl end group polyester are those processes disclosed in U.S. Pat. No. 2,863,855 and British Pat. No. 1,048,068.

It is also known that polyesters may be further stabilized by the incorporation of a phosphorus component into the system during the melt phase. Phosphorus compounds which have been identified as polyester stabilizers by the prior art are compounds such as phosphorus acids including phosphorous or phosphoric acid or their esters or salts including the aryl phosphites and/or arylphosphates, the alkyl phosphites and/or alkyl phosphates, the cycloalkyl phosphites and/or cycloalkyl phosphates, and the arylalkyl phosphites, the alkaryl phosphites and/or alkaryl phosphates, and/or arylalkyl phosphates and the like. Representative of the specific types of phosphorus containing compounds employed as polyester stabilizers by the prior art are those set forth in U.S. Pat. Nos. 2,938,015 and 3,404,121. All of the prior art phosphorus containing compounds, however, have the disadvantage of being either unduly volatile or being available as aqueous concentrates, wherein the presence of water in the hot melt addition results in depolymerization of the polymer.

The volatile compounds are obviously lost to a major degree in the high temperature processing conditions employed in the preparation of polyesters. Correspondingly, aqueous concentrates of non-volatile compounds are unsatisfactory in that they cannot be beneficially added to the polyester system after the intrinsic viscosity has reached 0.2 in that acid/water will de-esterify the polymer. The latter disadvantage may be overcome, of course, by addition during the direct esterification or ester interchange stage rather than the polymerization stage. Due to the tendency of phosphorus containing compounds to poison polyester polymerization catalysts, it is desirable to add the phosphorous containing compound late in the polymerization stage or at lease after the intrinsic viscosity has reached 0.2.

It is readily apparent that a process which efficiently incorporates a phosphorus stabilizer in a low carboxyl end group polyester would be a significant advance in the polyester industrial yarn field.

It is therefore an object of this invention to provide a process for incorporating a phosphorus-containing compound in a low carboxyl end group polyester without either substantial poisoning of the catalyst, degrading the polymer or loss of substantial amounts of the phosphorus containing compound.

It is another object of this invention to provide a process for the incorporation of a phosphorus-containing compound into a low carboxyl end group polyester having an intrinsic viscosity of at least 0.2.

These and other objects of the invention will be more readily apparent from the following detailed description.

In accordance with this invention it has now been discovered that low carboxyl end group polyesters may be stabilized against melt degradation and strength loss by the addition to the polyester, after the polycondensation stage, of stabilizing amounts of polyphosphoric acid having the structure

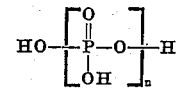

wherein $n$ is greater than or equal to 3.

The polyester at the point of polyphosphoric acid addition should have an intrinsic viscosity of at least 0.2. The polyphosphoric acid should be added to the polymer in amounts in excess of 0.001 weight percent based on the weight of the polymer. While the polyester polymer may be any low carboxyl end group filament forming polyester polymer, the preferred polymer is poly(ethylene terephthalate) produced in either a batch or continuous process; that is to say, produced either from the direct esterification of terephthalic acid or from the ester interchange of dimethyl terephthalate.

Various other materials may be present in the reaction mixture. For example, such ester interchange catalysts as salts of zinc, calcium, manganese, magnesium, or lanthanum and such polymerization catalysts as antimony oxide may be present. While antimony is the preferred catalyst, it should be understood that other polymerization catalysts are equally applicable. In general, the amount of polyphosphoric acid may be increased as the weight of the catalyst is increased. In the case of $Sb_2O_3$ catalyst, the polyphosphoric acid may be employed in quantities of up to 25 percent of the weight of the $Sb_2O_3$ employed. Preferably the weight of polyphosphoric acid is not in excess of .045 percent by weight based on the weight of the polymer. Additional catalysts which have been found to be suitable for polymerization are metals, metal oxides or selected metal compounds of, for example, tin, lead, zinc, titanium, bismuth, lanthanum, gallium, germanium, indium, aluminum, arsenic, and boron.

The polyphosphoric acid with which this invention is concerned is a clear, colorless, viscous, hygroscopic liquid which has a $P_2O_5$ content between 82 and 89 percent by weight. The specific gravity at 83 percent $P_2O_5$ is 2.060 at 20° C. In contradistinction to this product, the phosphoric acid or orthophosphoric acid of the prior art may be prepared from polyphosphoric acid by dilution with the proper amount of water. Pure phosphoric acid ($H_3PO_4$) has a theoretical $P_2O_5$ content of 72.4 percent by weight. Correspondingly, polyphosphoric acid can be prepared by heating mixtures of orthophosphoric acid with phosphorus pentoxide.

The fiber forming polyesters with which this invention is concerned are the condensation products of dicarboxylic acids such as terephthalic acid and glycols of the series $HO(CH_2)_n OH$ where $n$ is an integer from 2 to 10. The most important example of this class of polyesters is poly(ethylene terephthalate) which may be prepared by known processes such as are disclosed by Whinfield and Dickson in Canadian Pat. No. 490,196. For use as reinforcing elements in rubber structures, melt-spun filaments or poly(ethylene terephthalate) are drawn to about 3.5 to 7.0 times their length after melt spinning, twisted into yarns and plied into cords or woven into fabrics. The cords or fabrics are treated with adhesive and bonded against or into the rubber structures.

Synthetic linear polyester yarns or cords made by known means can be shown to contain a free carboxyl end group concentration of from 30 to 60 or more equivalents per million grams. By "free carboxyl end groups" are meant the acid group -COOH, the concentration of which may be determined by Pohl's Method as described in Analytical Chemistry Vol. 26, page 1,614, October 1954. The formation of such free carboxyl end groups results as a natural consequence of the processes normally employed in the production of linear polyester polymers.

Known synthetic linear polyester yarns or cords for use as rubber structure reinforcing elements are preferably made from a polymer having an intrinsic viscosity of from 0.75 to 1.0 or higher. Whereas synthetic linear polyester filaments used in textile products normally have an intrinsic viscosity of the polymer of from 0.35 to 0.66, these filaments are less suitable as rubber reinforcing elements since they are comparatively weak at a given extension level and fatigue to rupture with relatively little flexing. Filaments made from higher intrinsic viscosity synthetic linear polyester are stronger and less susceptible to such flex fatigue. It has been found, however, that in the production of a polymer of a high intrinsic viscosity by the normal method of extending the polymerization period, an increase in free carboxyl group concentration results. Thus, while a high intrinsic viscosity polymer may be produced to overcome the problem of filament strength and flex fatigue, at the same time the added carboxyl end group content results in an increase in the amount of strength lost when the filaments are exposed to high temperatures under hydrolytic conditions in rubber.

By "intrinstic viscosity" is meant the reduced viscosity of the polymer at zero concentration, which may be determined by measuring the flow times of a polymer solution after successive dilutions with fresh solvent, calculating the reduced viscosities, and extrapolating a plot of the reduced viscosities against concentration to zero concentration. The reduced viscosity is obtained from the expression:

Flow time of polymer solution/Flow time of solvent —
$1 \times 1/c$ where $c$ is the concentration expressed as grams of polymer per 100 ml. of solvent. As used herein, the intrinsic viscosity was measured at 25° C., using orthochlorophenol as a solvent in a modified Ostwald viscometer.

While the free carboxyl end group present in the polyester polymer employed in this invention may be reduced by any of those processes recited in the prior art, it is preferred that the free carboxyl end groups be reduced by adding to the polyester a substituted glycidyl ether. The substituted glycidyl ether reacts with the carboxyl end groups present in the polyester molecules to form esters containing free hydroxyl end groups. Such molecules may then react further to produce higher molecular weight molecules. The preferred process of obtaining low carboxyl end group polyester therefore comprises the steps of reacting the reaction product of (A) polyesters formed by the reaction of at least one dicarboxylic acid and at least one glycol of the series $HO(CH_2)n OH$ wherein $n$ is an integer from 2 to 10, such a polyester having in the molecule a terminal carboxyl group, and (B) a substituted glycidyl ether of the formula:

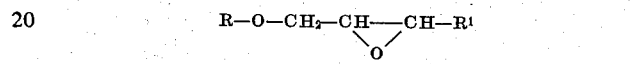

where R and $R^1$ are selected from the group consisting of hydrogen, aliphatic, cycloaliphatic or aromatic groups.

By "substituted glycidyl ether" is meant any material represented by the formula:

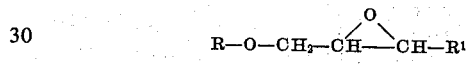

where R and $R^1$ may be hydrogen, aliphatic, cycloaliphatic, or aromatic groups, for example,

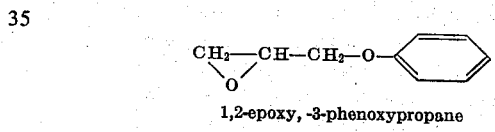

1,2-epoxy, -3-phenoxypropane

Such substituted glycidyl ethers may be saturated or unsaturated. Additional examples of useful substituted glycidyl ethers include, among others, allyl glycidyl ether and 1-butoxy-2, 3-epoxypropane.

The following specific examples are given for purposes of illustration and should not be deemed as limiting the spirit or scope of this invention.

EXAMPLE 1

125 parts of ethylene glycol, 200 parts of terephthalic acid, and 0.05 parts of sodium hydroxide are put in a steel reactor and are heated to 240° C under pressure. Water and ethylene glycol are then distilled from the reactor until the direct esterification is completed (120–160 minutes). The vessel pressure is reduced to atmospheric and 0.24 parts of antimony trioxide are added to the reaction mixture. The autoclave is then evacuated to 0.1 mm pressure of mercury and the reaction is heated to 290° C. After approximately 5 hours of polycondensation, 1.58 parts of phenyl glycidyl ether are added to the stirred mixture and the resulting product is quenched via extrusion into cold water. The final polyester will have an intrinsic viscosity of 0.89 (8 percent O-chlorophenol, 25° C) and will be light yellow and clear in appearance. The carboxyl end group concentration will vary between 10 and 20$\mu$ equivalents per gram in the polymer.

EXAMPLE 2

The process of Example 1 is repeated except that 5 minutes after the addition of antimony trioxide to the reaction vessel, 0.04 parts of trimethylphosphite in ethylene glycol are also added to the mixture. The final polyester polymer is found to have an intrinsic viscosity of 0.88 and a grey-green opaque appearance. The carboxyl end group concentration will vary between 10 and 20$\mu$ equivalents per gram in the polymer.

EXAMPLE 3

The process of Example 1 is repeated except that well after the addition of antimony trioxide to the reaction vessel, o.04 parts of polyphosphoric acid is added to the reaction vessel, the time of addition corresponding to an intrinsic viscosity of between 0.20 and 0.25 in the polycondensation stage of the polymer. The final polyester polymer is found to have an intrinsic viscosity of 0.88 and a clear and slightly yellow appearance.

EXAMPLE 4

The process of Example 3 is repeated except that the amount of polyphosphoric acid is increased to 0.243 parts by weight, the polyphosphoric acid being added to the reaction mixture at the 0.20 to 0.25 intrinsic viscosity stage of polycondensation. After 7 hours of polymerization at 0.1 mm pressure of mercury, the reaction product is found to have an intrinsic viscosity below that necessary for industrial yarns. Satisfactory polymerization is apparently inhibited by excessive amounts of polyphosphoric acid.

EXAMPLE A

The polymer from each of Examples 1, 2, and 3 is converted into 1,100 denier yarn using melt spinning techniques familiar to those skilled in the art. Three ends from each of the three examples are then twisted to a twist level of 10 turns per inch "Z," and the resulting yarns three plied to a twist level of 10 turns per inch "S." The plied yarns or tire cord samples are then adhesive treated in a manner commonly used to prepare polyester tire cords. The composition of the adhesive used is decribed by R. G. Aitken et al in Rubber World, February 1965. A drying temperature of 200° F is used to dry the adhesive, and the dried cord subsequently heat treated at 475° C while the cord samples are held to length. The treated cord samples are then bonded into black rubber of a type which is used in the carcass of passenger car tires and the resulting vulcanized assemblies held at 150° C for 24 hours. The cords are subsequently removed and tested. It is found that cord prepared from the control polymer of Example 1 lost the most strength while the polymer of Example 3 lost the least strength. Example 2 is found to exhibit a strength loss intermediate that of Examples 1 and 3.

EXAMPLE 5

30.0 parts of dimethylterephthalate, 21.6 parts of ethylene glycol, and 0.005 parts of zinc acetate are charged to a steel autoclave equipped with heater, stirrer, nitrogen inlet, and fractionating condenser. The mixture is stirred and heated at atmospheric pressure for about 3 hours, during which time the methanol reaction by-product is distilled from the mixture. The autoclave temperature is found to rise from 170° to 220° C before the ester interchange is completed. The vessel is then purged with nitrogen and 0.030 parts of antimony trioxide is added to the mixture. The mixture is then heated to 290° C under reduced pressure and after 4.5 hours at 290° C and 0.1 mm of mercury, 0.150 parts of monoepoxide is added to the vessel to reduce carboxyl end group concentration. The mixture is stirred an additional ten minutes at reduced pressure and the product is extruded into a water bath. The final polyester is found to be clear, light yellow in appearance and to have an intrinsic viscosity of 0.85. The carboxyl end group concentration of the product is found to vary between 12 and 20$\mu$ equivalents per gram.

EXAMPLE 6

The ester-interchange product is prepared as described in Example 5 and 0.030 parts of antimony trioxide are added before the polycondensation stage of reaction is started. The reaction temperature is raised to 290° C and the vacuum is slowly lowered to 0.07 mm of mercury. After the resin has reached 0.2 to 0.25 intrinsic viscosity, 0.006 parts by weight based on the weight of dimethyl terephthalate of polyphosphoric acid are added to the mixture and the polymerization is completed in the manner of Example 5. The final product is found to have an intrinsic viscosity of 0.86, have a clear, light yellow appearance, and a carboxyl end group concentration between 10 and 20$\mu$ equivalents per gram.

EXAMPLE B

The process of Example A is repeated except that polymer from each of Examples 5 and 6 is converted to yarn and thence to cord and rubber bonded samples. It is found that cord prepared from the polymer of Example 5 lost the most strength while the polymer of Example 6 lost the least strength.

Having thus disclosed the invention, what is claimed is:

1. In a process for manufacturing a stabilized low carboxyl end group fiber or film forming polyester wherein said polyester is the condensation product of a dicarboxylic acid and a glycol of the series HO(CH$_2$)$_n$OH wherein $n$ is an integer of from 2 to 10, the improvement which comprises the step of adding from 0.001 to 0.045 weight percent based on the polymer of polyphosphoric acid having the structure:

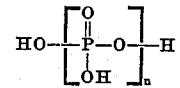

where $n$ is greater than or equal to 3, to polyester having an intrinsic viscosity of at least 0.2.

2. The process of claim 1, wherein said polyester is polyethelene terephthalate having not more than 20 free carboxyl end groups per million grams of polyester.

3. The process of claim 1, wherein said polyphosphoric acid has a P$_2$O$_5$ content of between 82 and 84 percent by weight.

4. In a process for manufacturing heat and hydrolytic stabilized polyethelene terephthalate having not more than 20 carboxyl end groups, the improvement which comprises the step of adding to the polycondensation stage, when the intrinsic viscosity is at least 0.1, from 0.001 to 0.045 percent by weight of polyphosphric acid, having the structure:

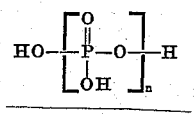

where $n$ is greater than or equal to 3.

5. The process of claim 4, wherein said polyethelene terephthalate is prepared by the direct esterification of terephthalic acid and ethylene glycol.

6. In the process of claim 4, wherein said polyethelene terephthalate is prepared by an ester interchange reaction of ethylene glycol and dimethyl terephthalate.

7. In the process of claim 4, wherein said low carboxyl end groups are obtained by the addition to the polyester, prior to the addition of said polyphosphoric acid of phenyl glycol ether.

8. The process of claim 4, wherein said polyester is subsequently hot melt extruded to form continuous filaments.

* * * * *